US012330437B2

(12) United States Patent
Humenick et al.

(10) Patent No.: US 12,330,437 B2
(45) Date of Patent: Jun. 17, 2025

(54) SYSTEMS AND METHODS FOR DYE SUBLIMATION WITH DOUBLE-SIDED IMAGE INFUSION

(71) Applicant: SEKISUI KYDEX, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: SEKISUI KYDEX, LLC, Bloomsburg, PA (US)

( * ) Notice: Subject to any disclaimer, the term of this patent is extended or adjusted under 35 U.S.C. 154(b) by 0 days.

(21) Appl. No.: 17/972,336

(22) Filed: Oct. 24, 2022

(65) Prior Publication Data

US 2023/0128401 A1 Apr. 27, 2023

Related U.S. Application Data

(60) Provisional application No. 63/272,105, filed on Oct. 26, 2021, provisional application No. 63/272,109, filed on Oct. 26, 2021.

(51) Int. Cl.

| | |
|---|---|
| ***B41M 5/382*** | (2006.01) |
| ***B41F 16/00*** | (2006.01) |
| ***B41F 33/00*** | (2006.01) |

(52) U.S. Cl.

CPC ..... *B41M 5/38221* (2013.01); *B41F 16/0006* (2013.01); *B41F 33/00* (2013.01); *B41M 2205/02* (2013.01)

(58) Field of Classification Search

CPC .......... B41M 5/38221; B41M 2205/02; B41F 16/0006; B41F 33/00

See application file for complete search history.

(56) References Cited

U.S. PATENT DOCUMENTS

| | | | | |
|---|---|---|---|---|
| 4,242,092 A * | 12/1980 | Glover | D06P 5/003 427/148 |
| 5,644,351 A | 7/1997 | Matsumoto et al. | |
| 5,856,267 A | 1/1999 | Sherman et al. | |
| 6,228,805 B1 | 5/2001 | Ohshima et al. | |

(Continued)

FOREIGN PATENT DOCUMENTS

| | | |
|---|---|---|
| JP | 6890643 B2 | 6/2021 |
| WO | WO-2020/162958 A1 | 8/2020 |

OTHER PUBLICATIONS

International Search Report and Written Opinion on PCT App.PCT/US2022/046816 dated Mar. 10, 2023 (16 pages).

(Continued)

*Primary Examiner* — Jill E Culler

(74) *Attorney, Agent, or Firm* — FOLEY & LARDNER LLP

(57) ABSTRACT

An illustrative dye sublimation apparatus may include a pair of printed sheets placed on either side of a substrate that allows for image infusion on both sides of the substrate. A second heat source, such as a heated plate, is included in order to heat the second printed sheet. Compared to the conventional systems in which a single heat source heats a single printed, the embodiments disclosed herein describe a process for simultaneous double-sided image infusion, which results in a substrate with sublimated images on both sides.

21 Claims, 5 Drawing Sheets

(56) References Cited

U.S. PATENT DOCUMENTS

| | | | |
|---|---|---|---|
| 7,077,926 B2 | 7/2006 | Goffi et al. | |
| 7,563,341 B2 | 7/2009 | Ferguson et al. | |
| 7,870,824 B2 * | 1/2011 | Helma | B41J 2/325 101/34 |
| 9,962,979 B2 * | 5/2018 | Will | B41F 16/008 |
| 10,583,686 B1 | 3/2020 | Moalli | |
| 10,940,715 B2 | 3/2021 | Moalli | |
| 11,065,909 B2 | 7/2021 | Moalli | |
| 11,919,328 B2 | 3/2024 | Moalli | |
| 2002/0148054 A1 | 10/2002 | Drake | |
| 2005/0248649 A1 | 11/2005 | Farrell et al. | |
| 2007/0163057 A1 | 7/2007 | Bertele et al. | |
| 2011/0229664 A1 | 9/2011 | Hoggard | |
| 2012/0196085 A1 | 8/2012 | Langan et al. | |
| 2014/0131987 A1 | 5/2014 | Royle | |
| 2015/0029289 A1 | 1/2015 | Rosner et al. | |
| 2016/0031228 A1 | 2/2016 | Will et al. | |
| 2019/0193446 A1 | 6/2019 | Ramsden | |
| 2020/0147996 A1 | 5/2020 | Moalli et al. | |

OTHER PUBLICATIONS

International Search Report and Written Opinion on PCT Application PCT/US2022/046817 dated Jan. 11, 2023 (9 pages).

Invitation to Pay Additional Fees on PCT Application PCT/US2022/046816 dated Jan. 5, 2023 (2 pages).

* cited by examiner

100

200

300

500

SYSTEMS AND METHODS FOR DYE SUBLIMATION WITH DOUBLE-SIDED IMAGE INFUSION

CROSS-REFERENCE TO RELATED APPLICATIONS

This application claims the benefit of and priority to U.S. Provisional Application No. 63/272,109, filed Oct. 26, 2021, and U.S. Provisional Application No. 63/272,105, filed Oct. 26, 2021, the entire disclosures of which are incorporated by reference herein.

TECHNICAL FIELD

This application is directed generally towards a dye sublimation apparatus (also referred to as a dye sublimation machine) and more specifically towards systems and methods for a dye sublimation machine for double-sided image infusion.

BACKGROUND

Dye sublimation is a process of infusing images into a substrate. An image to be infused is printed on a paper (or any type of sheet) using sublimation dyes (contained in the sublimation inks) and the printed paper is pressed against a substrate under heat. The heat causes the dyes to sublimate from a solid state on the printed paper to a gaseous state to travel to the substrate, where the dyes get deposited as solids. This sublimation process therefore infuses the image in the printed paper into the substrate. As the infused image is embedded within the substrate, the image may not chip, fade, or delaminate like the capped and printed images.

A dye sublimation apparatus may have a heating section to generate the heat for sublimating the dyes such that the dye can travel from the printed paper (or printed sheet) into the substrate. For example, FIG. 1 shows a conventional heating section 100 of a conventional dye sublimation apparatus. As shown, the heating section 100 includes a bed 102, a substrate 104, a printed sheet 106, a membrane 108, and a bank of heaters 110. The membrane 108 applies pressure to press the printed sheet 106 onto the substrate 104, and the bank of heaters generates a radiating heat to heat a printed sheet 104, thereby transferring the dyes from the printed sheet 106 into the substrate 104.

However, the aforementioned conventional method has several technical shortcomings with regard to image infusion. For example, due in part to heat being generated only on a single side of the substrate 104 and printed sheet 106 combination, it is only feasible to infuse a single image from a single printed sheet into the side of the combination receiving the heat. Furthermore, because the combination of the substrate 104 and printed sheet 106 must rest on a surface (e.g., bed 102) while in the dye sublimation apparatus, it is not technically feasible to heat the combination from below under traditional methods in order to address these one-sided concerns.

As such, a significant improvement upon a process for producing substrates with double-sided infusions is desired.

SUMMARY

What is therefore desired are dye sublimation systems and methods with double-sided image infusion. What is further desired are dye sublimation systems and methods that infuse an image into both sides of a substrate during the dye sublimation process.

Embodiments described herein attempt to solve the aforementioned technical problems and may provide other benefits as well. An illustrative dye sublimation machine (also referred to as a dye sublimation apparatus) may be a dye sublimation machine with a heated plate on which a substrate and printed sheet are placed. The heated plate then provides a second source of heat (along with a heater bank above the substrate and printed sheet) for the combination that is below. The heated plate may provide heat to the combination from below, thereby allowing a second printed sheet to be included below the substrate and enabling infusion of a second image into another side of the substrate. Furthermore, because the heated plate is in direct contact with the substrate and printed sheet combination, the heat being applied to the combination can be more finely controlled.

In one embodiment, a dye sublimation apparatus for infusing a first image on a first printed sheet and a second image on a second printed sheet to a substrate includes a heated plate configured to receive the first printed sheet, the substrate, and the second printed sheet. A membrane covers the first printed sheet, the substrate, and the second printed sheet, and is configured to apply pressure to the first printed sheet, the substrate, and the second printed sheet. A heat source is positioned, relative to the heated plate, on an opposing side of the first printed sheet, the substrate, and the second printed sheet and configured to heat the first printed sheet to sublimate one or more first dyes forming the first image. The heated plate is configured to heat the second printed sheet to sublimate one or more second dyes forming the second image, such that the one or more first dyes and one or more second dyes travel to the substrate in a gaseous state and deposit into the substrate in a solid state to infuse the first image and the second image into the substrate.

In another embodiment, a dye sublimation method for infusing a first image on a first printed sheet and a second image on a second printed sheet into a substrate includes providing the first printed sheet, the substrate, and the second printed sheet on a heated plate, the first printed sheet and the second printed sheet provided on opposing sides of the substrate; applying, via a membrane configured to cover the first printed sheet, the substrate, and the second printed sheet, pressure to the first printed sheet, the substrate, and the second printed sheet; and providing a heat source, the heated plate and the heat source positioned on opposing sides of the substrate. The dye sublimation method further includes heating, via at least one of the heated plate or the heat source, the first printed sheet to sublimate one or more first dyes forming the first image; and heating, via the other of the at least one heated plate or the heat source, the second printed sheet to sublimate one or more second dyes forming the second image, such that the one or more first dyes and one or more second dyes travel to the substrate in a gaseous state and deposit into the substrate in a solid state to infuse the first image and the second image into the substrate.

In another embodiment, a dye sublimation apparatus for infusing a first image on a first printed sheet and a second image on a second printed sheet into a substrate includes a heated plate configured to receive the first printed sheet, the substrate, and the second printed sheet and a heat source positioned, relative to the heated plate, on an opposing side of the first printed sheet, the substrate, and the second printed sheet. The heat source is configured to heat the first printed sheet to sublimate one or more first dyes forming the first image, and the heated plate configured to heat the second printed sheet to sublimate one or more second dyes forming the second image, such that the one or more first dyes and one or more second dyes travel to the substrate in a gaseous state and deposit into the substrate in a solid state to infuse the first image and the second image into the substrate.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
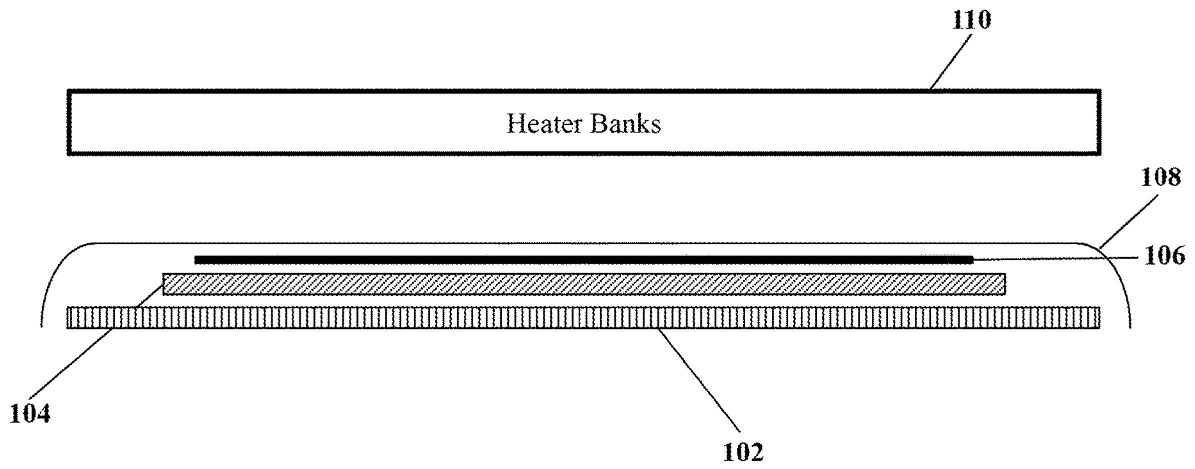
FIG. 1 PRIOR ART
FIG. 1 shows an example of a heating section of a conventional dye sublimation apparatus.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe an improved dye sublimation machine with a more efficient and versatile ability to infuse an image into both sides of a substrate during the dye sublimation process. More specifically, the dye sublimation machine may feature a heated plate in the place of a traditional bed on which the substrate and one or more printed sheets are placed. By including a heated plate beneath the substrate and printed sheets, the improved dye sublimation machine provides a second source of heat that can facilitate infusion of an image from a second printed sheet. In other embodiments, the traditional heater bank above the substrate and printed sheet combination is replaced by a second heated plate.

Figure 2:
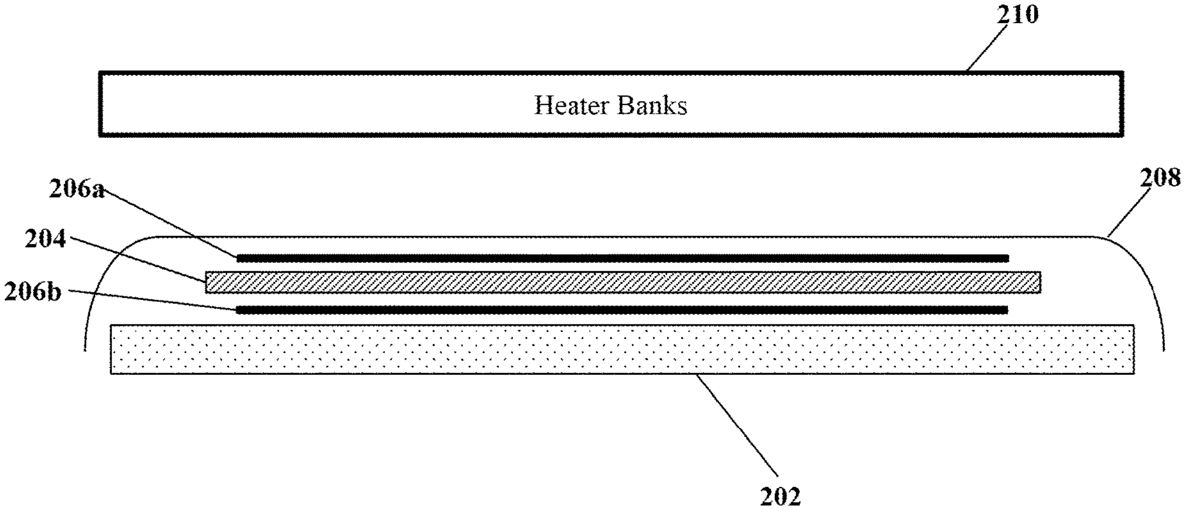
FIG. 2 shows an illustrative dye sublimation apparatus with double-sided image infusion, according to an embodiment.

FIG. 2 shows an illustrative dye sublimation machine (also referred to as dye sublimation apparatus) 200, according to an embodiment. It should be understood that the dye sublimation machine 200 shown in FIG. 2 and described herein is merely for illustration and explanation, and machines with other form factors and components should also be considered within the scope of this disclosure. For example, dye sublimation machines having additional, alternative, or a fewer number of components than the illustrative dye sublimation machine 200 should be included within the scope of this disclosure.

The dye sublimation machine 200 may comprise a heated plate 202, which may provide structural support and heat for the components of the dye sublimation machine 200. The heated plate 202 is structured to receive a first printed sheet 206*a*, a substrate 204, and a second printed sheet 206*b*, all of which are covered by a membrane 208. The first printed sheet 206*a* and second printed sheet 206*b* (collectively referred to as the printed sheets 206) may each have an image thereon printed using sublimation inks containing sublimation dyes. In some embodiments, the first printed sheet 206*a* and the second printed sheet 206*b* have the same image thereon printed (such that the finished substrate 204 has the same image on both sides), while in other embodiments, the first printed sheet 206*a* and the second printed sheet 206*b* have different images thereon printed (such that the finished substrate 204 has different images on each side). The substrate 204 may be of any type of material such as thermoplastic where the image may be infused through the dye sublimation process.

The combination of the first printed sheet 206*a*, second printed sheet 206*b*, and the substrate 204 may be loaded onto the heated plate 202. The heated plate 202 may comprise any smooth surface that can conduct heat and support the substrate 204 and printed sheets 206, such as a metal or cast iron sheet. The heated plate 202 further includes one or more heater elements that warm the surface of the heated plate 202. The one or more heater elements may be a set of heated coils that receive an electric current that generates heat, which radiates out from the heated coils, or may include one or more gas burners that receive a flow of natural gas that generates flames and heats the heated plate 202 surface.

The dye sublimation machine 200 may comprise one or more radiating heater elements. As shown in FIG. 2, the dye sublimation machine 200 comprises a heater bank 210 positioned above the heated plate 202. Although the illustrative dye sublimation machine 200 is shown to comprise a single heater element positioned above the heated plate 202, any number of heater elements (e.g., a single heater element, three heater elements, etc.) may be included and may be located anywhere throughout the dye sublimation machine 200 in order to provide heat to the top of the substrate 204 and printed sheets 206.

By providing heat from both above and below the substrate 204 and printed sheets 206 combination, the dye sublimation machine 200 enables simultaneous infusion of images into either side of the substrate 204, which would not otherwise be possible. In current dye sublimation machines that only include a single heat source above the substrate and printed sheet combination, the heat energy from the single heat source is insufficient to heat an underneath printed sheet (e.g., the second printed sheet 206*b*) due to the density of the substrate. If the amount of heat energy from the single heat source is increased in order to heat the underneath printed sheet, the top printed sheet (e.g., the first printed sheet 206*a*) is likely to be burned. As such, there is no way to reliably perform "double-sided infusion" (i.e., infusing images into two sides of a substrate with two separate printed sheets simultaneously) with current technology.

Within the dye sublimation machine, a membrane 208 may cover the combination of the first printed sheet 206*a*, the substrate 204, and the second printed sheet 206*b*. The membrane 208 may be formed by any kind of material that may withstand the heat for repeated heating cycles in the dye sublimation machine 200. A vacuum pump may pull down the membrane 208 such that the membrane 208 may cover the combination of first printed sheet 206*a*, the substrate 204, and the second printed sheet 206*b* snugly without air bubbles. In some embodiments, the membrane 208 may include a first membrane and a second membrane as described below with reference to FIG. 3.

In an illustrative operation, a worker may place the second printed sheet 206*b* on the heated plate, place the substrate 204 directly on the second printed sheet 206*b*, and place the first printed sheet 206*a* directly on the substrate 204. Within the dye sublimation machine 200, the vacuum pump may pull a vacuum between the membrane 208 and the heated plate 202 such that the membrane 208 presses down the substrate 204 and printed sheets 206. The heated plate 202 and heater bank 210 may generate a requisite amount heat to sublimate the ink on the second printed sheet 206*b* and the first printed sheet 206*a* respectively. The sublimated ink may then be deposited into the substrate 204. The sensors may measure the temperature at different spots within the enclosure created by the membrane 208 and the heated plate 202 and the temperature measurements may be used by the heated plate 202 and the heater bank 210 to regulate the generated heat. After the combination of the first printed sheet 206*a*, the substrate 204, and the second printed sheet 206*b* are left in the dye sublimation machine 200 for a requisite amount of time (e.g., based upon the properties of the substrate 204, based on the desired image quality, based on the temperature of the heated plate 202 and heater bank 210), the worker removes the combination of the first printed sheet 206*a*, the substrate 204, and the second printed sheet 206*b*. After this process, the image in the first printed sheet 206*a* may be infused (or deposited) into a top surface of the substrate 204, and the image in the second printed sheet 206*b* may be infused (or deposited) into a bottom surface of the substrate 204, such that the image from the first printed sheet 206*a* appears on the top surface of the substrate 204 and the image from the second printed sheet 206*b* appears on the bottom surface of the substrate 204.

Figure 3:
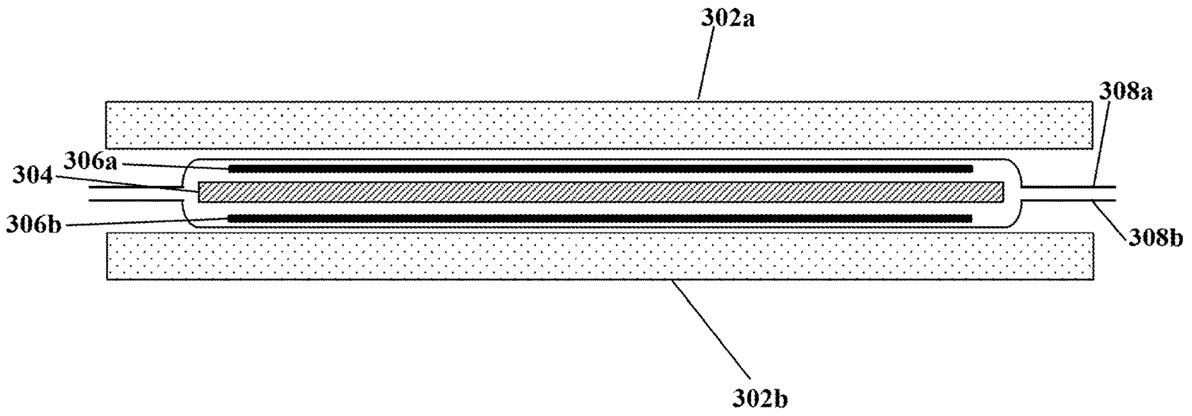
FIG. 3 shows an illustrative dye sublimation apparatus with double-sided image infusion, according to an embodiment.

FIG. 3 shows an illustrative dye sublimation machine (also referred to as dye sublimation apparatus) 300, according to an embodiment. It should be understood that the dye sublimation machine 300 shown in FIG. 3 and described herein is merely for illustration and explanation and machines with other form factors and components should also be considered within the scope of this disclosure. For example, dye sublimation machines having additional, alternative, or a fewer number of components than the illustrative dye sublimation machine 300 should be included within the scope of this disclosure.

The dye sublimation machine 300 may comprise a first heated plate 302*a*, which may provide heat for the components of the dye sublimation machine 300, and a second heated plate 302*b*, which may provide structural support and heat for the components of the dye sublimation machine 300. The second heated plate 302*b* is structured to receive a first printed sheet 306*a*, a substrate 304, and a second printed sheet 306*b*. The first printed sheet 306*a* and second printed sheet 306*b* (collectively referred to as the printed sheets 306) may each have an image thereon printed using sublimation inks containing sublimation dyes. In some embodiments, the first printed sheet 306*a* and the second printed sheet 306*b* have the same image thereon printed (such that the finished substrate 304 has the same image on both sides), while in other embodiments, the first printed sheet 306*a* and the second printed sheet 306*b* have different images thereon printed (such that the finished substrate 304 has different images on each side). The substrate 304 may be of any type of material, such as thermoplastic or fabric, where the image(s) may be infused through the dye sublimation process.

As shown in FIG. 3, the combination of the substrate 304 and the printed sheets 306 are surrounded by a first membrane 308*a* and a second membrane 308*b* (collectively referred to as a double membrane 308). The first membrane 308*a* and the second membrane 308*b* may be formed by any kind of material that may withstand the heat for repeated heating cycles in the dye sublimation machine 300. A vacuum pump may pull the first membrane 308*a* down and the second membrane 308*b* up such that the combination of first printed sheet 306*a*, the substrate 304, and the second printed sheet 306*b* is surrounded by the double membrane 308 snugly without air bubbles. Generally, the double membrane 308 is used to maintain a pressure on the first printed sheet 306*a*, the substrate 304, and the second printed sheet 306*b* in order to keep the printed sheets 306 in snug contact with the substrate 304 during the dye sublimation process. The double membrane 308 here is technologically beneficial because the double membrane 308 improves the consistency of pressure applied to the top and bottom by having separate membranes (i.e., the first membrane 308*a* and the second membrane 308*b*) each apply pressure to the separate printed sheets (i.e., the first printed sheet 306*a* and the second printed sheet 306*b*, respectively). However, in some embodiments (not pictured), the double membrane 308 is only a single membrane (i.e., either the first membrane 308*a* alone or the second membrane 308*b* alone) or is omitted entirely, such that pressure is instead applied by the first heated plate 302*a* and the second heated plate 302*b*.

The combination of the first printed sheet 306*a*, second printed sheet 306*b*, and the substrate 304 may be loaded between the first heated plate 302*a* and the second heated plate 302*b*. The first heated plate 302*a* and the second heated plate 302*b* may comprise any surface that can conduct heat and support the substrate 304 and printed sheets 306, such as a metal or cast iron sheet. The first heated plate 302*a* and the second heated plate 302*b* further include one or more heater elements that warm the surface of the first heated plate 302*a* and the second heated plate 302*b*. The one or more heater elements may be a set of heated coils that receive an electric current that generates heat, which radiates out from the heated coils, or may include one or more gas burners that receive a flow of natural gas that generates flames and heats the surfaces of the first heated plate 302*a* and the second heated plate 302*b*.

In some embodiments, the first heated plate 302*a* and the second heated plate 302*b* are stationary or fixed, such that the substrate 304 and printed sheets 306 combination is placed between the first heated plate 302*a* and the second heated plate 302*b*, and any pressure on the combination is applied via the double membrane 308. In other embodiments, at least one of the first heated plate 302*a* and the second heated plate 302*b* are movable, such that the substrate 304 and printed sheets 306 combination is placed on the second heated plate 302 and then one or both of the first heated plate 302*a* and the second heated plate 302*b* move. The second heated plate 302*b* may move upwards, the first heated plate 302*a* may move downwards, or both the first heated plate 302*a* and the second heated plate 302*b* may move towards each other in order to reduce a distance between the first heated plate 302*a* and the substrate 304 and printed sheets 306 combination. In some embodiments, the first heated plate 302*a* and/or the second heated plate 302*b* move until the first heated plate 302*a* is a pre-defined distance (e.g., 1") from the substrate 304 and printed sheets 306 combination. In other embodiments, the first heated plate 302*a* and/or the second heated plate 302*b* move until the first heated plate 302*a* is in contact with the substrate 304 and printed sheets 306 combination. In these embodiments, the moving first heated plate 302*a* and/or second heated plate 302*b* apply a pressure to the substrate 304 and printed sheets 306 combination, which allows the double membrane 308 to be omitted.

In some embodiments, the first heated plate 302*a* and the second heated plate 302*b* may each be mechanically coupled to a motor that provides a driving force to the first heated plate 302*a* and/or the second heated plate 302*b*. In these embodiments, a worker loads the substrate 304 and printed sheets 306 combination onto the second heated plate 302*b*, and at least one motor (i.e., a motor coupled to the first heated plate 302*a* and/or a motor coupled to the second heated plate 302*b*) is engaged to move one or both of the first heated plate 302*a* and the second heated plate 302*b*. The at least one motor may be automatically engaged (e.g., upon sensing that the substrate 304 and printed sheets 306 combination is in place via a sensor) or may be engaged by the worker (e.g., pressing a button on the dye sublimation machine 300, entering a command on a computer coupled to the dye sublimation machine 300, etc.). In other embodiments, the first heated plate 302*a* and the second heated plate 302*b* are mechanically coupled to a hand-crank or similar mechanism, such that the first heated plate 302*a* and the second heated plate 302*b* are able to be manually moved by a worker. In these embodiments, the worker loads the substrate 304 and printed sheets 306 combination onto the second heated plate 302*b* and engages the hand-crank to move the first heated plate 302*a* and the second heated plate 302*b* into position.

By providing heat from both above and below the substrate 304 and printed sheets 306 combination, the dye sublimation machine 300 enables simultaneous infusion of images into either side of the substrate 304, which would not otherwise be possible. In current dye sublimation machines that only include a single heat source above the substrate and printed sheet combination, the heat energy from the single heat source is insufficient to heat an underneath printed sheet (e.g., the second printed sheet 306*b*) due to the density of the substrate. If the amount of heat energy from the single heat source is increased in order to heat the underneath printed sheet, the top printed sheet (e.g., the first printed sheet 306*a*) is likely to be burned. As such, there is no way to reliably perform "double-sided infusion" (i.e., infusing images into two sides of a substrate with two separate printed sheets simultaneously) with current technology.

Furthermore, by utilizing two heated plates (e.g., the first heated plate 302*a* and the second heated plate 302*b*) for simultaneous direct heat rather than one or more indirect heat sources that radiate heat (e.g., heater bank 210), the dye sublimation machine 300 provides more consistent and controllable heat, thereby improving the quality of the infused image. In addition, in those embodiments in which the first heated plate 302*a* and the second heated plate 302*b* are movable, the heated plates may provide pressure onto the substrate 304 and printed sheets 306 combination, which can not only improve the quality of the image infusion but also remove the necessity of including the membrane (e.g., the double membrane 308) and vacuum pump.

In an illustrative operation, a worker may place the second printed sheet 306*b* on the second membrane 308*b* on the second heated plate 302*b*, place the substrate 304 directly on the second printed sheet 306*b*, and place the first printed sheet 306*a* directly on the substrate 304. The first membrane 308*a* is then placed on the first printed sheet 306*a*, and the vacuum pump may pull a vacuum between the double membrane 308 such that the double membrane 308 presses down the substrate 304 and printed sheets 306 combination. From there, the first heated plate 302*a* and/or the second heated plate 302*b* are moved to an operating position, and then may generate a requisite amount heat to sublimate the ink on the first printed sheet 306*a* and the second printed sheet 306*b* respectively. The sublimated ink may then be deposited into the substrate 304. The sensors may measure the temperature at different spots within the enclosure created by the double membrane 308, the first heated plate 302*a*, and the second heated plate 302*b*, and the temperature measurements may be used by the first heated plate 302*a* and the second heated plate 302*b* to regulate the generated heat. After the combination of the first printed sheet 306*a*, the substrate 304, and the second printed sheet 306*b* are left in the dye sublimation machine 300 for a requisite amount of time (e.g., based upon the properties of the substrate 304, based on the desired image quality, based on the pressure applied, based on the temperature of the first heated plate 302*a* and the second heated plate 302*b*), the first heated plate 302*a* and the second heated plate 302*b* are moved apart, and the worker removes the combination of the first printed sheet 306*a*, the substrate 304, and the second printed sheet 306*b*. After this process, the image in the first printed sheet 306*a* may be infused (or deposited) into a top surface of the substrate 304, and the image in the second printed sheet 306*b* may be infused (or deposited) into a bottom surface of the substrate 304, such that the image from the first printed sheet 306*a* appears on the top surface of the substrate 304 and the image from the second printed sheet 306*b* appears on the bottom surface of the substrate 304.

Figure 4:
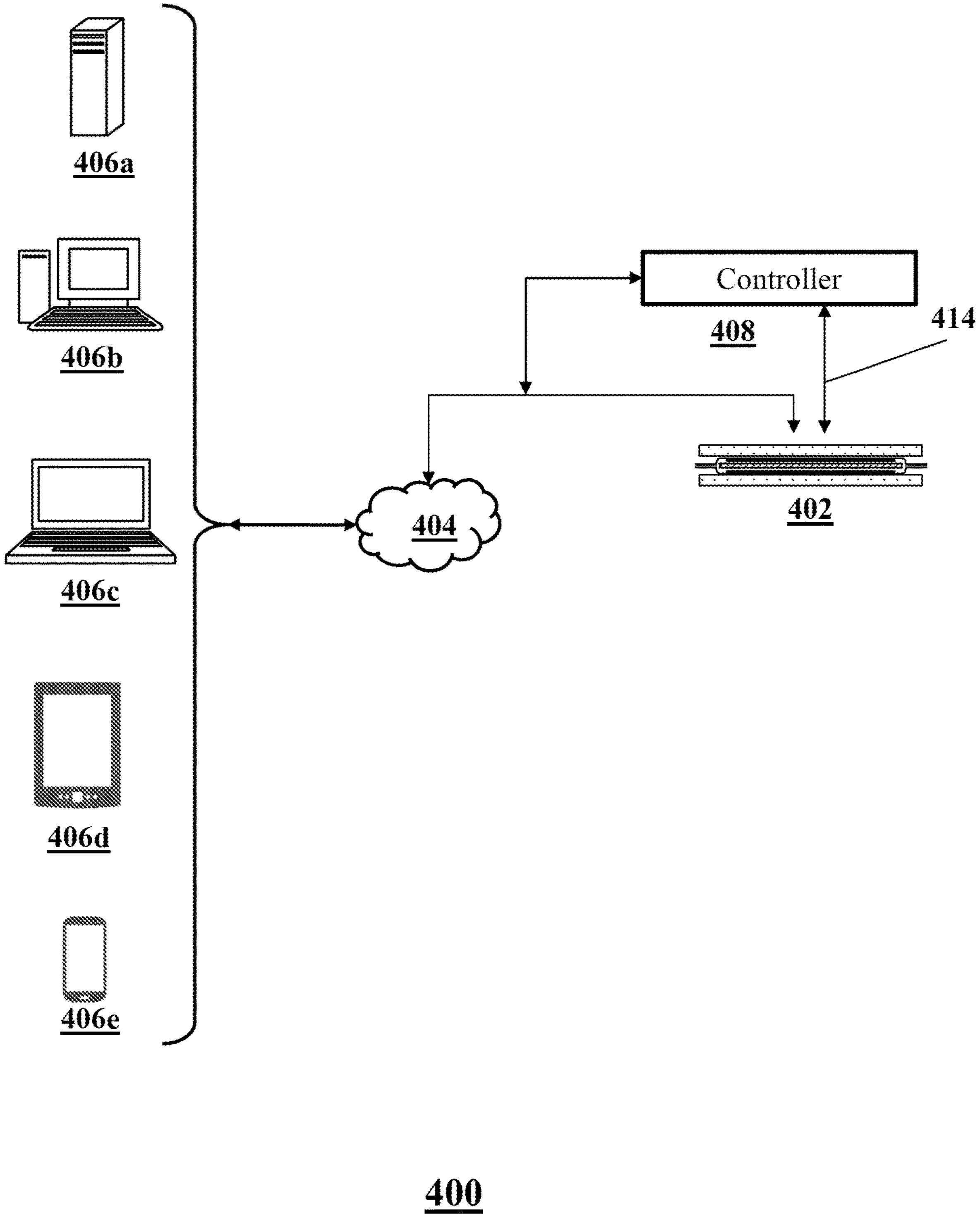
FIG. 4 shows an illustrative system for dye sublimation, according to an embodiment.

FIG. 4 shows an illustrative system 400 for dye sublimation, according to an embodiment. As shown, the system 400 may comprise a dye sublimation apparatus (also referred to as a dye sublimation machine) 402, a network 404, computing devices 406*a*, 406*b*, 406*c*, 406*d*, 406*e* (collectively or commonly referred to as 406), and a controller 408. It should be understood that the system 400 and the aforementioned components are merely for illustration and systems with additional, alternative, and a fewer number of components should be considered within the scope of this disclosure.

The dye sublimation apparatus 402 may be a combination of components that may simultaneously infuse (or dye sublimate) images from two separate printed sheets on either side of a substrate into the substrate. The images may be printed using sublimation inks containing sublimation dyes that may transform from solid state to gaseous state when heated to a predetermined temperature. The sublimation dyes may travel to the substrate and deposit therein thereby creating an infused image within the substrate. In order to provide sufficient heat to each printed sheet, the substrate and printed sheets are placed on a heated plate that can provide heat from below. In some embodiments, the dye sublimation apparatus 402 may include a heater bank that provides heat to the top of the substrate and printed sheets, while in other embodiments, the dye sublimation apparatus 402 includes a second heated plate on top of the substrate and printed sheets. A membrane is placed over the substrate and printed sheets and is pulled down toward the heated plate via a vacuum pump, which ensures a tight fit and consistent pressure on the substrate and printed sheets.

The heater bank, heated plate(s), and vacuum pump may be controlled by a controller 408. The single controller 408 is shown merely for illustration and there may be a plurality of controllers 408 controlling the heater bank and vacuum pump. More particularly, the controller 408 may regulate the heat generated by the heater bank, and may regulate an amount of suction generated by the vacuum pump. For example, the controller 408 may increase the heat, decrease the heat, turn ON, or turn OFF the heater bank and heated plate. In another example, the controller 408 may increase the suction, decrease the suction, turn ON, or turn OFF the vacuum pump in order to affect the pressure applied on the texture sheet and adjust a depth of the applied texture. The controller 408 may be any kind of hardware and/or software controller, including, but not limited to PID (proportional-integral-derivative) controller and/or any other type of controller. The controller 408 may continuously receive a feedback from the items being heated (e.g., printed sheet, substrate) through a connection 414. The connection 414 may be wired, e.g., a wired connection from a plurality of sensors providing the feedback to the controller 408, or wireless, e.g., a plurality of sensors wirelessly providing the feedback to the controller 408.

In addition to the controller 408, the heater bank, heated plate(s), and vacuum pump may be controlled based upon instructions provided by a computing device 406. For example, the computing device 406 may include an interface for a user to enter a desired amount of bed temperature for a particular image and the computing device 406 may provide instructions to the heater bank through the network 404 to maintain the temperature in the dye sublimation apparatus 402. Alternatively or additionally, the computing device 406 may provide the instruction to maintain the temperature to the controller 408. It should be understood that the instructions to maintain the temperature/pressure and the process of maintaining the temperature may be maintained either in hardware, e.g., through the controller 408, or as a combination of hardware and software, e.g., through one or more applications in the computing device 406, the controller 408, and/or other hardware components in the dye sublimation apparatus.

The computing devices 406 may include any type processor-based device that may execute one or more instructions (e.g., instructions to cause a uniform temperature distribution in the dye sublimation apparatus 402) to the dye sublimation apparatus 402 through the network 404. Non-limiting examples of the computing devices 406 include a server 406*a*, a desktop computer 406*b*, a laptop computer 406*c*, a tablet computer 406*d*, and a smartphone 406*e*. However, it should be understood that the aforementioned devices are merely illustrative and other computing devices should also be considered within the scope of this disclosure. At minimum, each computing device 406 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 406.

The network 404 may be any kind of local or remote network that may provide a communication medium between the computing devices 406 and the dye sublimation apparatus 402. For example, the network 404 may be a local area network (LAN), a desk area network (DAN), a metropolitan area network (MAN), or a wide area network (WAN). However, it should be understood that aforementioned types of networks are merely illustrative and any type of component providing the communication medium between the computing devices 406 and the dye sublimation apparatus 402 should be considered within the scope this disclosure. For example, the network 404 may be a single wired connection between a computing device 406 and the dye sublimation apparatus 402.

Figure 5:
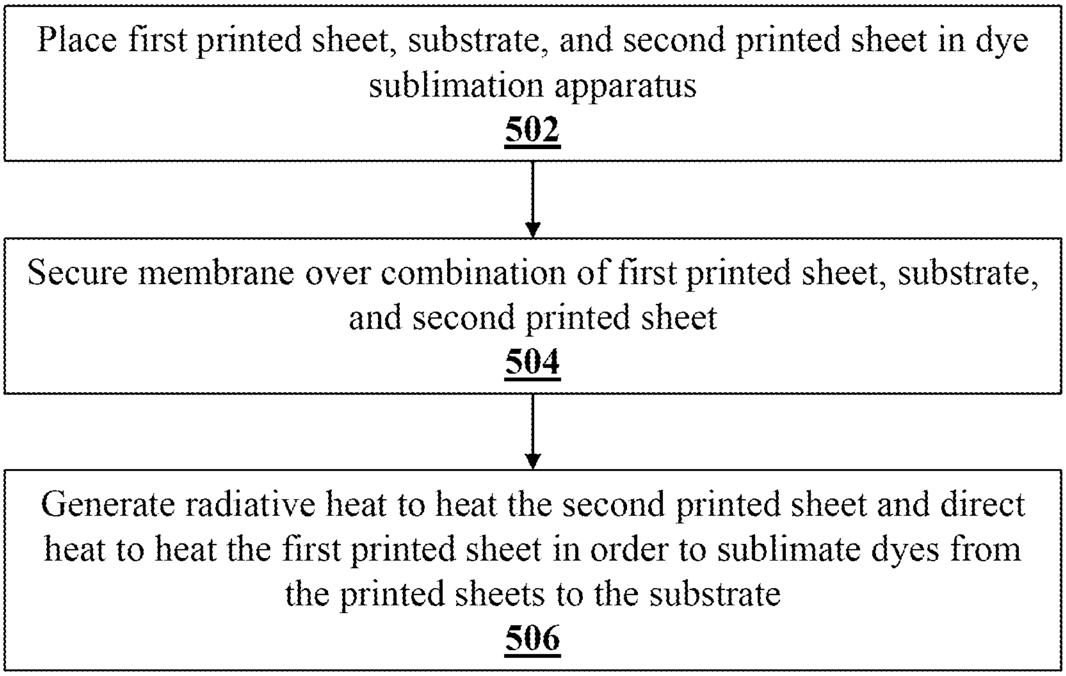
FIG. 5 shows a flow diagram of an illustrative method for dye sublimation, according to an embodiment.

FIG. 5 shows a flow diagram of an illustrative method 500 for dye sublimation, according to an embodiment. The steps of the method 500 described herein are merely illustrative and methods with alternative, additional, and fewer number of steps should also be considered within the scope of this disclosure.

The method may begin at step 502 where a user places a first printed sheet on a heated plate in a dye sublimation apparatus, places a substrate on the first printed sheet, and places a second printed sheet on the substrate.

At step 504, a membrane is secured over the combination of the first printed sheet, the substrate, and the second printed sheet, and a vacuum pump is engaged to pull down the membrane snugly over the combination. In this way, there is substantially no air between the substrate and the first printed sheet or the substrate and the second printed sheet.

At step 506, a heater bank may generate radiative heat (also referred to as radiating heat) to heat the second printed sheet and the heated plate may generate direct heat to heat the first printed sheet, to sublimate dyes from the printed sheets into the substrate.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A dye sublimation apparatus for infusing a first image on a first printed sheet and a second image on a second printed sheet into a substrate, the dye sublimation apparatus comprising:

a heated plate configured to receive the first printed sheet, the substrate, and the second printed sheet;

a membrane configured to form an enclosure around the first printed sheet, the substrate, and the second printed sheet;

a vacuum pump fluidly coupled to the enclosure, the vacuum pump configured to reduce a pressure within the enclosure, such that the membrane applies a compressive force to the first printed sheet, the substrate, and the second printed sheet based on the reduced pressure; and a heat source positioned, relative to the heated plate, on an opposing side of the first printed sheet, the substrate, and the second printed sheet, and the membrane, the heat source configured to heat the first printed sheet to sublimate one or more first dyes forming the first image, and the heated plate configured to heat the second printed sheet to sublimate one or more second dyes forming the second image, such that the one or more first dyes and one or more second dyes travel to the substrate in a gaseous state and deposit into the substrate in a solid state to infuse the first image and the second image into the substrate, wherein the membrane is a double membrane comprising a first membrane positioned between the heated source and the first printed sheet and a second membrane positioned between the heated plate and the second printed sheet, the first membrane and the second membrane forming the enclosure, and wherein the controller is further configured to apply the compressive force to the first printed sheet, the substrate, and the second printed sheet via the double membrane.

2. The dye sublimation apparatus of claim 1, further comprising:

a controller configured to transmit control signals to at least one of the heated plate, the vacuum pump, or the heat source.

3. The dye sublimation apparatus of claim 1, wherein the heat source is a heater bank that generates radiating heat to indirectly heat the membrane, the first printed sheet, the substrate, and the second printed sheet.

4. The dye sublimation apparatus of claim 1, wherein the heated plate and the heat source provide direct heat through physical contact to the membrane, the first printed sheet, the substrate, and the second printed sheet.

5. The dye sublimation apparatus of claim 1, wherein the heated plate is a first heated plate and the heat source is a second heated plate.

6. The dye sublimation apparatus of claim 1, wherein at least one of the heated plate or the heat source is structured to move along an axis formed perpendicular to a face of the substrate.

7. The dye sublimation apparatus of claim 6, wherein the at least one of the heated plate or the heat source is structured to move based on a signal from sensor configured to sense the presence of the first printed sheet, the substrate, and the second printed sheet.

8. The dye sublimation apparatus of claim 1, wherein at least one of the heated plate or the heat source is structured to move between a receiving position to receive the first printed sheet, the substrate, and the second printed sheet, and an operating position to apply pressure to the first printed sheet, the substrate, and the second printed sheet.

9. The dye sublimation apparatus of claim 1, wherein the first image and the second image are different.

10. The dye sublimation apparatus of claim 1, wherein a vacuum in the enclosure pulls the first membrane down and the second membrane up.

11. A dye sublimation method for infusing a first image on a first printed sheet and a second image on a second printed sheet into a substrate, the dye sublimation method comprising:

providing the first printed sheet, the substrate, and the second printed sheet on a heated plate, the first printed sheet and the second printed sheet provided on opposing sides of the substrate;

applying, via a membrane configured to form an enclosure around the first printed sheet, the substrate, and the second printed sheet, a force to the first printed sheet, the substrate, and the second printed sheet, wherein the force is provided via a vacuum pump fluidly coupled to the enclosure and configured to reduce a pressure within the enclosure;

providing a heat source, the heated plate and the heat source positioned on opposing sides of the substrate, the first printed sheet, the second printed sheet, and the membrane;

heating, via at least one of the heated plate or the heat source, the first printed sheet to sublimate one or more first dyes forming the first image; and heating, via the other of the at least one heated plate or the heat source, the second printed sheet to sublimate one or more second dyes forming the second image, such that the one or more first dyes and one or more second dyes travel to the substrate in a gaseous state and deposit into the substrate in a solid state to infuse the first image and the second image into the substrate, wherein the membrane is a double membrane comprising a first membrane and a second membrane, and wherein the first membrane and the second membrane are positioned on opposing sides of the first printed sheet, the substrate, and the second printed sheet to form the enclosure.

12. The dye sublimation method of claim 11, wherein the first image and the second image are the same image.

13. The dye sublimation method of claim 11, wherein the heated plate is a first heated plate, and the heat source is a second heated plate.

14. The dye sublimation method of claim 11, further comprising:

moving, from a receiving positioned configured to receive the first printed sheet, the substrate, and the second printed sheet, at least one of the heated plate or the heat source to an operating position.

15. The dye sublimation method of claim 11, wherein in the operating position the at least one of the heated plate or the heat source is configured to apply pressure to the first printed sheet, the substrate, and the second printed sheet.

16. The dye sublimation method of claim 11, wherein the heat source is a radiant heat source, the method further comprising indirectly heating, via the radiant heat source, the first printed sheet to sublimate one or more first dyes forming the first image or the second printed sheet to sublimate one or more second dyes forming the second image.

17. The dye sublimation method of claim 11, wherein a vacuum in the enclosure generated by the vacuum pump pulls the first membrane down and the second membrane up.

18. A dye sublimation apparatus for infusing a first image on a first printed sheet and a second image on a second printed sheet into a substrate, the dye sublimation apparatus comprising:

a heated plate configured to receive the first printed sheet, the substrate, and the second printed sheet;

a first membrane and a second membrane, the first membrane and the second membrane configured to form an enclosure around the first printed sheet, the substrate, and the second printed sheet, the first membrane and the second membrane configured to apply a compressive force to the first printed sheet, the substrate, and the second printed sheet; and an indirect heat source positioned apart from the membrane and, relative to the heated plate, on an opposing side of the first printed sheet, the substrate, and the second printed sheet, the indirect heat source configured to indirectly heat the first printed sheet to sublimate one or more first dyes forming the first image, and the heated plate configured to heat the second printed sheet to sublimate one or more second dyes forming the second image, such that the one or more first dyes and one or more second dyes travel to the substrate in a gaseous state and deposit into the substrate in a solid state to infuse the first image and the second image into the substrate.

19. The dye sublimation apparatus of claim 18, wherein at least one of the heated plate or the heat source is structured to move to reduce a distance between the indirect/stationary heat source and the first printed sheet, the substrate, and the second printed sheet.

20. The dye sublimation apparatus of claim 18, further comprising a vacuum pump fluidly coupled to the enclosure, the vacuum pump configured to reduce a pressure within the enclosure, such that the membrane applies the compressive force to the first printed sheet, the substrate, and the second printed sheet based on the reduced pressure.

21. The dye sublimation apparatus of claim 18, wherein a vacuum in the enclosure generated by the vacuum pump pulls the first membrane down and the second membrane up.

* * * * *